US012776109B2

(12) United States Patent
Yang

(10) Patent No.: US 12,776,109 B2
(45) Date of Patent: Oct. 27, 2026

(54) FRAME RATE CHANGING METHOD, SYSTEM AND DEVICE FOR AUGMENTED REALITY DEVICE AND STORAGE MEDIUM

(71) Applicant: GOERTEK INC., Weifang (CN)

(72) Inventor: Qinghe Yang, Weifang (CN)

(73) Assignee: GOERTEK INC., Weifang (CN)

( * ) Notice: Subject to any disclaimer, the term of this patent is extended or adjusted under 35 U.S.C. 154(b) by 135 days.

(21) Appl. No.: 18/579,533

(22) PCT Filed: Dec. 16, 2021

(86) PCT No.: PCT/CN2021/138681
§ 371 (c)(1),
(2) Date: Jan. 16, 2024

(87) PCT Pub. No.: WO2023/000598
PCT Pub. Date: Jan. 26, 2023

(65) Prior Publication Data

US 2024/0320932 A1 Sep. 26, 2024

(30) Foreign Application Priority Data

Jul. 20, 2021 (CN) ......................... 202110816562.3

(51) Int. Cl.
*G06T 19/00* (2011.01)
*H04N 7/01* (2006.01)

(52) U.S. Cl.
CPC ........... *G06T 19/006* (2013.01); *H04N 7/013* (2013.01)

(58) Field of Classification Search
None
See application file for complete search history.

(56) References Cited

U.S. PATENT DOCUMENTS

2013/0257752 A1 10/2013 Tripathi et al.
2016/0098095 A1* 4/2016 Gonzalez-Banos ..... A63F 13/92 345/156

(Continued)

FOREIGN PATENT DOCUMENTS

CN 105872698 A 8/2016
CN 106919358 A 7/2017

(Continued)

OTHER PUBLICATIONS

International Search Report from International Application No. PCT/CN2021/138681 mailed Apr. 21, 2022.

*Primary Examiner* — David H Chu
(74) *Attorney, Agent, or Firm* — Shih IP Law Group, PLLC

(57) ABSTRACT

A frame rate changing method for an augmented reality device, including: obtaining scenario information of the augmented reality device, the scenario information comprising at least one of an external environment image, a virtual image, and an attitude parameter of the augmented reality device; when the scenario information changes, obtaining a target frame rate of the augmented reality device according to change information of the scenario information; and updating a frame rate of the augmented reality device according to the target frame rate, to display target content at the target frame rate. The present disclose realizes dynamic updating of the refresh frame rate of the augmented reality device, which is facilitate to reducing the system power consumption of the augmented reality device.

8 Claims, 4 Drawing Sheets

(56) References Cited

U.S. PATENT DOCUMENTS

| | | | | |
|---|---|---|---|---|
| 2016/0262608 | A1* | 9/2016 | Krueger | G16H 40/63 |
| 2017/0323481 | A1* | 11/2017 | Tran | H04N 23/611 |
| 2017/0330496 | A1* | 11/2017 | Oravainen | G06T 3/4092 |
| 2018/0075820 | A1* | 3/2018 | Hicks | G06F 3/14 |
| 2019/0387168 | A1* | 12/2019 | Smith | G06T 7/246 |

FOREIGN PATENT DOCUMENTS

| | | | |
|---|---|---|---|
| CN | 109473082 | A | 3/2019 |
| CN | 112445315 | A | 3/2021 |
| CN | 113485544 | A | 10/2021 |

* cited by examiner

FRAME RATE CHANGING METHOD, SYSTEM AND DEVICE FOR AUGMENTED REALITY DEVICE AND STORAGE MEDIUM

The present disclosure claims the priority to the Chinese Patent Application No. 202110816562.3, entitled "FRAME RATE CHANGING METHOD, SYSTEM, AND DEVICE FOR AUGMENTED REALITY DEVICE, AND STORAGE MEDIUM" filed with China Patent Office on Jul. 20, 2021, the entire contents of which are incorporated into the present disclosure by reference.

TECHNICAL FIELD

The present disclosure relates to a technical field of image display, and more particularly, to a frame rate changing method, system and device for an augmented reality device, a storage medium.

DESCRIPTION OF RELATED ART

Augmented Reality (AR) technology refers to a technology that uses computers to generate a virtual environment with realistic vision, hearing, force, touch and movement. By wearing an AR device on the head of a user, a combination of the virtual environment and the real environment can be realized, thereby realizing direct and natural interaction between the user and the environment.

At present, when the existing AR devices present display content to users on a display screen, it is necessary to continuously refresh the displayed content at a high frame rate, resulting in increased power consumption of the AR devices.

SUMMARY

Embodiments of the present disclosure provide a frame rate changing method, system and device for an augmented reality device, and a storage medium, aiming at solving the technical problem of high power consumption of existing AR devices.

An embodiment of the present disclosure provides a frame rate changing method for an augmented reality device, including: obtaining scenario information of the augmented reality device, the scenario information including at least one of an external environment image, a virtual image, and an attitude parameter of the augmented reality device; obtaining, when the scenario information changes, a target frame rate of the augmented reality device according to change information of the scenario information; and updating a frame rate of the augmented reality device according to the target frame rate, to display target content at the target frame rate.

In an embodiment, determining the change information of the scenario information includes at least one of: a first change information between the current frame external environment image and a previous frame external environment image is not within a first preset range; a second change information between the current frame virtual image and a previous frame virtual image is not within a second preset range; a third change information between an attitude parameter of the augmented reality device at the current time and an attitude parameter of the augmented reality device at a previous time is not within a third preset range.

In an embodiment, obtaining, when the scenario information changes, a target frame rate of the augmented reality device according to change information of the scenario information includes: obtaining the first change information between the current frame external environment image and the previous frame external environment image, the second change information between the current frame virtual image and the previous frame virtual image, the third change information between the attitude parameter at the current time and the attitude parameter at the previous time, and a preset frame rate; and determining the target frame rate according to the first change information, the second change information, the third change information, and the preset frame rate.

In an embodiment, obtaining the first change information between the current frame external environment image and the previous frame external environment image includes: determining average pixel values of each pixel row and average pixel values of each pixel column in the current frame external environment image and the previous frame external environment image; and obtaining the first change information according to an average difference of the average pixel values of each pixel row between the current frame external environment image and the previous frame external environment image, and an average difference of the average pixel values of each pixel column between the current frame external environment image and the previous frame external environment image.

In an embodiment, obtaining the second change information between the current frame virtual image and the previous frame virtual image includes: determining average pixel values of each pixel row and average pixel values of each pixel column in the current frame virtual image and the previous frame virtual image; and obtaining the second change information according to an average difference of the average pixel values of each pixel row between the current frame virtual image and the previous frame virtual image, and an average difference of the average pixel values of each pixel column between the current frame virtual image and the previous frame virtual image.

In an embodiment, the attitude parameter includes coordinate information detected by a gyroscope, obtaining the third change information between the attitude parameter at the current time and the attitude parameter at the previous time includes: obtaining a coordinate difference between coordinate information at the current time and coordinate information at the previous time; and obtaining the third change information according to the coordinate difference.

In an embodiment, determining the target frame rate according to the first change information, the second change information, the third change information, and the preset frame rate includes: obtaining a first preset weight value corresponding to the external environment image, a second preset weight value corresponding to the virtual image, and a third preset weight value corresponding to the attitude parameter; determining a sum of a product of the first change information and the first preset weight value, a product of the second change information and the second preset weight value, a product of the third change information and the third preset weight value; and obtaining the target frame rate according to the sum of the products, the number of scenario information, and the preset frame rate.

In addition, in order to achieve the above purpose, the present disclosure also provides a frame rate changing system for an augmented reality device, including: a first acquisition module configured to obtain scenario information of the augmented reality device, the scenario information including at least one of an external environment image, a virtual image, and an attitude parameter of the augmented reality device; a second acquisition module configured to obtain, when the scenario information changes, a target frame rate of the augmented reality device according to change information of the scenario information; and a display module configured to update a frame rate of the augmented reality device according to the target frame rate, to display target content at the target frame rate.

In addition, in order to achieve the above purpose, the present disclosure also provides an augmented reality device, including: a memory, a processor, and a frame rate changing program stored on the memory and executable on the processor, wherein when the frame rate changing program is executed by the processor, steps of the above frame rate changing method are implemented.

In addition, in order to achieve the above purpose, the present disclosure also provides a storage medium, on which a frame rate changing program is stored, wherein when the frame rate changing program is executed by a processor, steps of the above frame rate changing method are implemented.

The frame rate changing method and system for an augmented reality device, the device and the storage medium provided in the embodiments of the present disclosure have at least the following technical effects or advantages.

The technical solution of obtaining, when the scenario information changes, a target frame rate of the augmented reality device according to change information of the scenario information, and updating a frame rate of the augmented reality device according to the target frame rate, to display target content at the target frame rate, solves the problem of high power consumption of existing AR devices, realizes dynamic update of the refresh rate of the augmented reality device, and is conducive to reducing the system power consumption of the augmented reality device.

DETAILED DESCRIPTIONS

Figure 1:
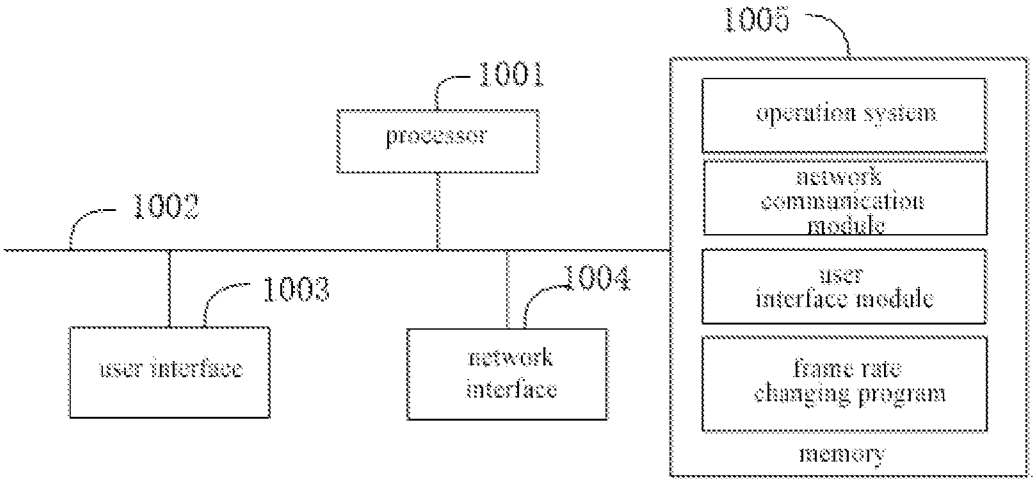
FIG. 1 is a schematic structural diagram of hardware operating environment according to an embodiment of the present disclosure.

In order to better understand the above technical solutions, exemplary embodiments of the present disclosure will be described in more detail below with reference to the accompanying drawings. Although exemplary embodiments of the present disclosure are shown in the drawings, it should be understood that the present disclosure may be embodied in various forms and should not be limited to the embodiments set forth herein. Rather, these embodiments are provided to provide a thorough understanding of the disclosure, and to fully convey the scope of the disclosure to those skilled in the art.

As illustrated in FIG. 1, FIG. 1 is a schematic structural diagram of hardware operating environment according to an embodiment of the present disclosure.

It should be noted that FIG. 1 may be a schematic structural diagram of hardware operating environment of the augmented reality device.

As illustrated in FIG. 1, the augmented reality device may include: a processor 1001 (such as a CPU), a memory 1005, a user interface 1003, a network interface 1004, and a communication bus 1002. Here, the communication bus 1002 is used to realize connection communication between these components. The user interface 1003 may include a display screen (Display) and an input unit (such as a keyboard), and optionally, the user interface 1003 may also include a standard wired interface and a wireless interface. The network interface 1004 may optionally include a standard wired interface or a wireless interface (such as a WI-FI interface). The memory 1005 may be a high-speed RAM memory or a non-volatile memory (such as a disk memory). The memory 1005 may optionally be a storage device independent of the aforementioned processor 1001.

Those skilled in the art will understand that the structure of the augmented reality device is not limited to the augmented reality device shown in FIG. 1, and may include more or fewer components than shown, or may include a combination of certain components or have different component arrangements.

As illustrated in FIG. 1, the memory 1005 as a storage medium may include an operation network communication module, a user interface module and a frame rate changing program. Here, an operation system manages and controls the operations of programs for hardware and software resources of the augmented reality device, the frame rate changing program, and other software or programs.

In the augmented reality device shown in FIG. 1, the user interface 1003 is mainly used to connect to a terminal and communicate with the terminal; the network interface 1004 is mainly used to communicate with a background server; and the processor 1001 may be used to execute the frame rate changing program stored in the memory 1005.

In the embodiment, the augmented reality device includes: a memory 1005, a processor 1001, and a frame rate changing program stored on the memory 1005 and executable on the processor.

Here, when the frame rate changing program stored in the memory 1005 is executed by the processor 1001, it performs the following operations.

Obtaining scenario information of the augmented reality device, the scenario information including at least one of an external environment image, a virtual image, and an attitude parameter of the augmented reality device.

Obtaining, when the scenario information changes, a target frame rate of the augmented reality device according to change information of the scenario information; and updating a frame rate of the augmented reality device according to the target frame rate, to display target content at the target frame rate.

Here, determining the change information of the scenario information includes at least one of: a first change information between the current frame external environment image and a previous frame external environment image is not within a first preset range; a second change information between the current frame virtual image and a previous frame virtual image is not within a second preset range; and a third change information between the attitude parameter of the augmented reality device at the current time and the attitude parameter of the augmented reality device at a previous time is not within a third preset range.

When the frame rate changing program stored in the memory 1005 is executed by the processor 1001, it may further perform the following operations.

Obtaining the first change information between the current frame external environment image and the previous frame external environment image, the second change information between the current frame virtual image and the previous frame virtual image, the third change information between the attitude parameter at the current time and the attitude parameter at the previous time, and a preset frame rate; and determining the target frame rate according to the first change information, the second change information, the third change information, and the preset frame rate.

When the frame rate changing program stored in the memory 1005 is executed by the processor 1001, it may further perform the following operations.

Determining average pixel values of each pixel row and average pixel values of each pixel column in the current frame external environment image and the previous frame external environment image; and obtaining the first change information according to an average difference of the average pixel values of each pixel row between the current frame external environment image and the previous frame external environment image, and an average difference of the average pixel values of each pixel column between the current frame external environment image and the previous frame external environment image.

When the frame rate changing program stored in the memory 1005 is executed by the processor 1001, it may further perform the following operations.

Determining average pixel values of each pixel row and average pixel values of each pixel column in the current frame virtual image and the previous frame virtual image; and obtaining the second change information according to an average difference of the average pixel values of each pixel row between the current frame virtual image and the previous frame virtual image, and an average difference of the average pixel values of each pixel column between the current frame virtual image and the previous frame virtual image.

The attitude parameter includes coordinate information detected by a gyroscope. When the frame rate changing program stored in the memory 1005 is executed by the processor 1001, it may further perform the following operations.

Obtaining a coordinate difference between coordinate information at the current time and coordinate information at the previous time; and obtaining the third change information according to the coordinate difference.

When the frame rate changing program stored in the memory 1005 is executed by the processor 1001, it may further perform the following operations.

Obtaining a first preset weight value corresponding to the external environment image, a second preset weight value corresponding to the virtual image, and a third preset weight value corresponding to the attitude parameter; determining a sum of a product of the first change information and the first preset weight value, a product of the second change information and the second preset weight value, a product of the third change information and the third preset weight value; and obtaining the target frame rate according to the sum of the products, the number of scenario information, and the preset frame rate.

An embodiment of the present disclosure provides an embodiment of the frame rate changing method for an augmented reality device. It should be noted that although the logical sequence is shown in the flow chart, in some cases, the steps shown or described can be executed in a sequence different from that here. The frame rate changing method for an augmented reality device is applied to the display processing of the augmented reality device.

Figure 2:
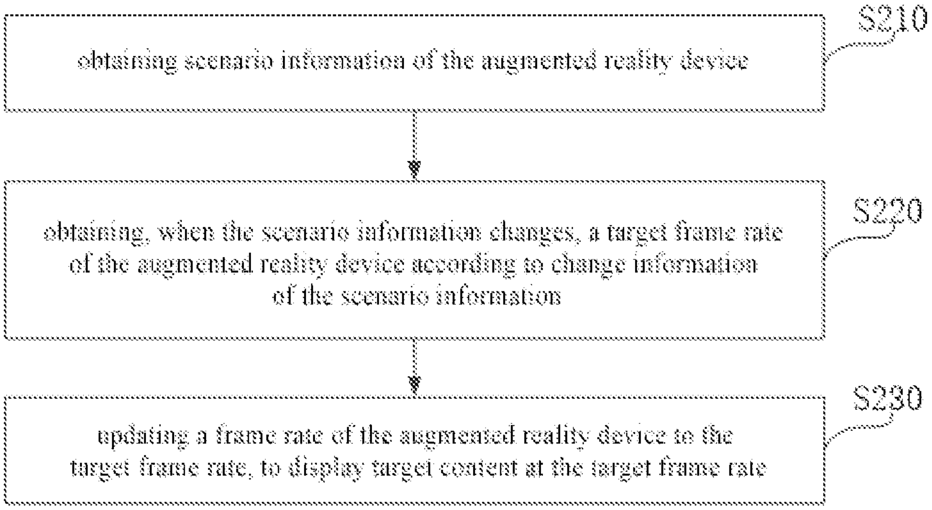
FIG. 2 is a schematic flow chart of a first embodiment of the frame rate changing method for an augmented reality device according to the present disclosure.

As illustrated in FIG. 2, in a first embodiment of the present disclosure, the frame rate changing method for an augmented reality device includes the following steps.

S210: Obtaining scenario information of the augmented reality device.

Augmented reality devices are abbreviated as AR devices, such as AR glasses. When a user wears an AR device on the head, the AR device can present real-world image content to the user in the user's field of vision. In addition, the real-world content can also be superimposed with additional virtual things. The superimposed virtual things can interact with reality things. For example, if a tree is seen in the real world through an AR device, by additionally superimposing virtual things, there will be an extra bird on the tree. In the embodiment, the scenario information includes at least one of an external environment image, a virtual image, and an attitude parameter of the augmented reality device. Here, the external environment image refers to the image content of the real world collected by the AR device that the user directly sees through the AR device, the external environment image can be collected through a camera provided on the AR device. The virtual image refers to the virtual content presented by the AR device. The attitude parameter includes coordinate information detected by a gyroscope, and the gyroscope is installed inside the AR device. The coordinate information detected by the gyroscope is the coordinate information of the AR device, and the coordinate information refers to three-dimensional space coordinates of the AR device. Based on the detected in real time attitude parameter, it can be determined whether the AR device is in a static state or in motion. Here, the state of the AR device depends on the user. When the user's head is relatively stationary, the AR device is in a static state; when the user's head moves relatively, the AR device is in motion.

S220: Obtaining, when the scenario information changes, a target frame rate of the augmented reality device according to change information of the scenario information.

In the embodiment, when the AR device displays target content for the user, it detects whether the scenario information is changed in real time, and when it is detected that the scenario information is changed, the change information of the scenario information is obtained, and then a target frame rate of a display screen of the AR device is calculated according to the change information, in order to further control the display screen, to display the target content at the target frame rate. The greater the frequency of changes in scenario information, the greater the obtained target frame rate. On the contrary, the smaller the frequency of changes in scenario information, the smaller the obtained target frame rate.

The change information of the scenario information may include a change of the target content to be displayed at the current time in the AR device display relative to the target content that has been displayed at a previous time, or a change of the external environment at the current time relative to the external environment at a previous time seen by the user through the AR device, or a change of the attitude of the AR device at the current time relative to the attitude of the AR device at a previous time due to the movement of the user's head relative to the outside world.

Specifically, the change of scenario information can be determined according to the current frame external environment image corresponding to the current time and the previous frame external environment image corresponding to the previous time, or the current frame virtual image corresponding to the current time and the previous frame virtual image corresponding to the previous time, or the attitude parameter at the current time and the attitude parameter at the previous time, so as to determine whether the scenario information has changed based on a difference between the two.

In addition, the method for determining the scenario information has changed includes at least one of the following methods.

Method 1: Comparing the current frame external environment image and the previous frame external environment image in real time to determine a first change information between the current frame external environment image and the previous frame external environment image, when the first change information between the current frame external environment image and the previous frame external environment image is not within a first preset range, it is determined that there is a difference between the current frame external environment image and the previous frame external environment image, i.e., it is determined that the scenario information has changed. By setting the first preset range in advance, when it is determined that the first change information of the external environment image is not within the first preset range, it is determined that the scenario information has changed, so as to avoid misidentifying changes in scene information due to minor difference between the current frame external environment image and the previous frame external environment image. Here, the first preset range is set in advance. Assuming that the first preset range is [0, 0.1], if the first change information is in the range of [0, 0.11, i.e., the first change information is within the first preset range, it is determined that the scenario information has not changed; if the first change information is in the range of (0.1, 7.5], i.e., the first change information is not within the first preset range, it is determined that the scenario information has changed.

Method 2: Comparing the current frame virtual image and the previous frame virtual image in real time to determine a second change information between the current frame virtual image and the previous frame virtual image, when the second change information between the current frame virtual image and the previous frame virtual image is not within a second preset range, it is determined that there is a difference between the current frame virtual image and the previous frame virtual image, i.e., it is determined that the scenario information has changed. By setting the second preset range in advance, when it is determined that the second change information of the virtual image is not within the second preset range, it is determined that the scenario information has changed, so as to avoid misidentifying changes in scene information due to minor differences between the current frame virtual image and the previous frame virtual image. For example, when an object in the virtual image moves significantly, the second change information between the current frame virtual image and the previous frame virtual image is not within the second preset range, at this time, it is determined that the scenario information has changed. When an object in the virtual image moves slightly, the second change information between the current frame virtual image and the previous frame virtual image is within the second preset range, at this time, even if the current frame virtual image changes relative to the previous frame virtual image, it may be determined that the scenario information has not changed, i.e., it is determined that the scenario information has not changed. Here, the second preset range is set in advance. Assuming that the second preset range is [0, 0.1], if the second change information is in the range of [0, 0.1], i.e., the second change information is within the second preset range, it is determined that the scenario information has not changed; if the second change information is in the range of (0.1, 7.5], i.e., the second change information is not within the second preset range, it is determined that the scenario information has changed.

Method 3: Comparing the attitude parameter at the current time and the attitude parameter at the previous time of the AR device in real time to determine a third change information between the attitude parameter at the current time and the attitude parameter at the previous time, when the third change information between the attitude parameter at the current time and the attitude parameter at the previous time is not within a third preset range, it is determined that the scenario information has changed. Here, the third preset range is set in advance. Assuming that the third preset range is [0, 0.1], if the third change information is in the range of [0, 0.1], i.e., the third change information is within the third preset range, it is determined that the scenario information has not changed; if the third change information is in the range of (1, 15], i.e., the third change information is not within the third preset range, it is determined that the scenario information has changed.

S230: Updating a frame rate of the augmented reality device according to the target frame rate, to display target content at the target frame rate.

In the embodiment, after obtaining the target frame rate, the current frame rate of the AR device is obtained, and then the target frame rate is used to update the current frame rate, and the display screen is controlled to display the target content according to the updated current frame rate. Using the target frame rate to update the current frame rate means replacing the current frame rate with the target frame rate. For example, the obtained target frame rate is 100 FPS and the current frame rate is 80 FPS, and in this case, after the target frame rate is used to update the current frame rate, the current frame rate becomes 100 FPS, and the display screen is controlled to display the target content at 100 FPS.

It should be noted that when it is determined that the scenario information has not changed, the frame rate of the AR device is not adjusted. For example, if the external environment of the scene changes slightly due to a slight movement of the AR device worn by the user, there is no need to adjust the current frame rate, i.e., the target content will still be displayed at the current frame rate.

Based on the above, the embodiment includes obtaining, when the scenario information changes, a target frame rate of the augmented reality device according to change information of the scenario information, and updating a frame rate of the augmented reality device according to the target frame rate, to display target content at the target frame rate, realizes dynamic update of the refresh rate of the augmented reality device, and is conducive to reducing the system power consumption of the augmented reality device.

Figure 3:
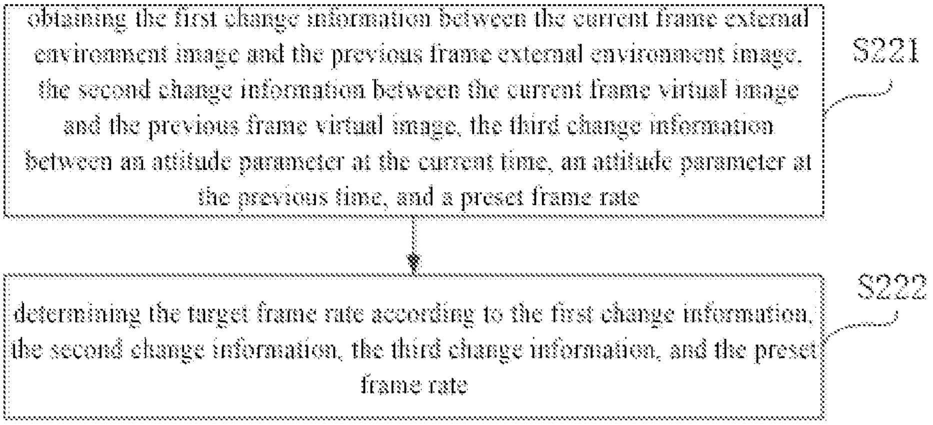
FIG. 3 is a schematic flow chart of a second embodiment of the frame rate changing method for an augmented reality device according to the present disclosure.

As illustrated in FIG. 3, in a second embodiment of the present disclosure, based on the first embodiment, the step S220 includes the following steps.

S221: Obtaining the first change information between the current frame external environment image and the previous frame external environment image, the second change information between the current frame virtual image and the previous frame virtual image, the third change information between the attitude parameter at the current time and an attitude parameter at the previous time, and a preset frame rate.

In the embodiment, the first change information refers to the degree of change of the current frame external environment image relative to the previous frame external environment image, which can be determined based on a pixel difference between the current frame external environment image and the previous frame external environment image. Likewise, the second change information refers to the degree of change of the current frame virtual image relative to the previous frame virtual image, which can be determined based on a pixel difference between the current frame virtual image and the previous frame virtual image. The third change information can be determined based on a parameter difference between the attitude parameters at the current time and the attitude parameters at the previous time. The preset frame rate refers to the maximum frame rate that the display screen of the AR device can accept.

Specifically, when it is determined that the scenario information has changed, the current frame external environment image and the previous frame external environment image, the current frame virtual image and the previous frame virtual image, the attitude parameters at the current time and the attitude parameters at the previous time, and the preset frame rate are respectively obtained. The first change information is obtained by comparing the pixels of the current frame external environment image and the pixels of the previous frame external environment image, the second change information is obtained by comparing the pixels of the current frame virtual image and the pixels of the previous frame virtual image, and the third change information is obtained by calculating the parameter difference between the attitude parameter at the current time and the attitude parameter at the previous time.

S222: Determining the target frame rate according to the first change information, the second change information, the third change information, and the preset frame rate.

In the embodiment, the step S222 specifically includes the following steps: obtaining a first preset weight value corresponding to the external environment image, a second preset weight value corresponding to the virtual image, and a third preset weight value corresponding to the attitude parameter; determining a sum of a product of the first change information and the first preset weight value, a product of the second change information and the second preset weight value, a product of the third change information and the third preset weight value; and obtaining the target frame rate according to the sum of the products, the number of scenario information, and the preset frame rate.

Specifically, the first preset weight value, the second preset weight value and the third preset weight value are all preset based on experience, the first preset weight value has a corresponding relationship with the external environment image, the second preset weight value has a corresponding relationship with the virtual image, and the third preset weight value has a corresponding relationship with the attitude parameter. After obtaining the first preset weight value, the second preset weight value and the third preset weight value. When the scenario information changes, the target frame rate of the AR device is calculated by using a preset target frame rate calculation formula, the target frame rate calculation formula is expressed as below:

$$F = \frac{C_1 \times W_1 + C_2 \times W_2 + C_3 \times W_3}{S} \times K.$$

In the above, F represents the target frame rate, S represents the number of scenario information, K represents the preset frame rate, $C_1$ represents the first change information, $C_2$ represents the second change information, $C_3$ represents the third change information, $W_1$ represents the first preset weight value, $W_2$ represents the second preset weight value, and $W_3$ represents the third preset weight value. The number of scenario information S is determined according to the information contained in the scenario information. The scenario information described in the present disclosure includes an external environment image, a virtual image, and an attitude parameter of the augmented reality device, S=3. The preset frame rate is a preset value, for example, K=120 FPS. Here, the value of $$\frac{C_1 \times W_1 + C_2 \times W_2 + C_3 \times W_3}{S}$$

is [0.5,1]; when S=3, and the value of $$\frac{C_1 \times W_1 + C_2 \times W_2 + C_3 \times W_3}{S}$$

is 1, the target frame rate F is 120 FPS; when S=3, and the value of $$\frac{C_1 \times W_1 + C_2 \times W_2 + C_3 \times W_3}{S}$$

is 0.5, the target frame rate F is 60 FPS. Here, according to experience, $W_1$ may be set to 0.4, $W_2$ may be set to 0.4, and $W_3$ may be set to 0.2.

According to the above technical solutions, the embodiment improves the accuracy of calculating the target frame rate.

Figure 4:
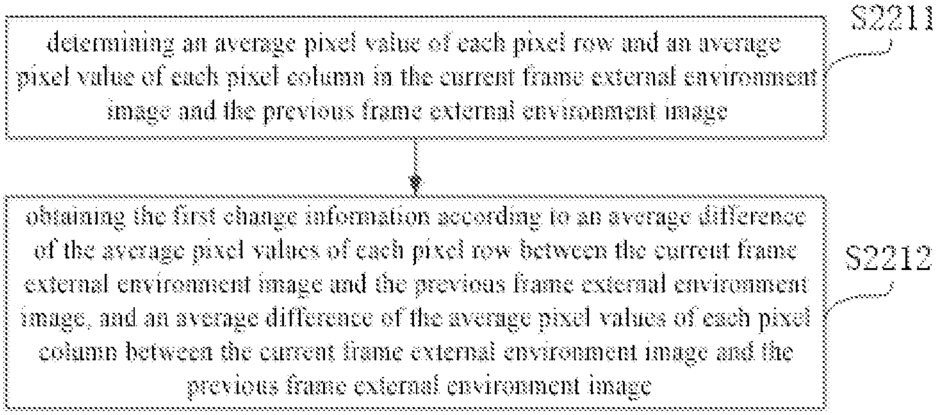
FIG. 4 is a schematic flow chart of a third embodiment of the frame rate changing method for an augmented reality device according to the present disclosure.

As illustrated in FIG. 4, in a third embodiment of the present disclosure, based on the first embodiment, obtaining the first change information between the current frame external environment image and the previous frame external environment image includes the following steps.

S2211: Determining average pixel values of each pixel row and average pixel values of each pixel column in the current frame external environment image and the previous frame external environment image.

In the embodiment, the average value of row pixels refers to an average of each row of pixels in the external environment image, and the average value of column pixels refers to an average of each column of pixels in the external environment image. Before determining the first change information, the average pixel value of each pixel row in the current frame external environment image and the average pixel value of each pixel row in the previous frame external environment image are respectively calculated based on a row pixel average calculation formula, the row pixel average calculation formula is expressed as below:

$$H = \frac{\sum_{i=1}^{i=n} pix(i)}{n}.$$

In the above, H represents the average value of row pixels, n represents the number of pixels in each row, i.e., the number of pixel columns in each frame of external environment image, and pix(i) represents the pixel value of the i-th pixel in each row.

Then, the average pixel values of each pixel column in the current frame external environment image and the average pixel values of each pixel column in the previous frame external environment image are respectively calculated based on a column pixel average calculation formula, the column pixel average calculation formula is expressed as below:

$$L = \frac{\sum_{j=1}^{j=m} pix(j)}{m}.$$

In the above, L represents the average value of column pixels, m represents the number of pixels in each column, i.e., the number of pixel rows in each frame of external environment image, and pix(j) represents the pixel value of the j-th pixel in each column.

S2212: Obtaining the first change information according to an average difference of the average pixel values of each pixel row between the current frame external environment image and the previous frame external environment image, and an average difference of the average pixel values of each pixel column between the current frame external environment image and the previous frame external environment image.

Specifically, the first change information is calculated using a first change information calculation formula, the first change information calculation formula is expressed as below:

$$C_1 = \frac{\sum_{p=1}^{p=m} (H_1(p) - H_2(p)) + \sum_{q=1}^{q=n} (L_1(q) - L_2(q))}{m+n}.$$

In order to distinguish them, the average pixel value of each pixel row in the current frame external environment image is expressed as $H_1$, the average pixel value of each pixel row in the previous frame external environment image is expressed as $H_2$, the average pixel values of each pixel column in the current frame external environment image is expressed as $L_1$, the average pixel values of each pixel column in the previous frame external environment image is expressed as $L_2$, $C_1$ represents the first change information, m represents the number of rows of pixels in the external environment image, n represents the number of columns of pixels in the external environment image, $H_1(p)$ represents the average value of row pixels of the p-th row in the current frame external environment image, $H_2(p)$ represents the average value of row pixels of the p-th row in the previous frame external environment image, $L_1(q)$ represents the average value of column pixels of the q-th column in the current frame external environment image, $L_2(q)$ represents the average value of column pixels of the q-th column in the previous frame external environment image, $H_1(p)-H_2(p)$ represents an average difference between the average value of row pixels of the p-th row in the current frame external environment image and the average value of row pixels of the p-th row in the previous frame external environment image, $L_1(q)-L_2(q)$ represents an average difference between the average value of column pixels of the q-th column in the current frame external environment image and the average value of column pixels of the q-th column in the previous frame external environment image.

According to the above technical solutions, the embodiment improves the accuracy of obtaining the first change information between the current frame external environment image and the previous frame external environment image.

Figure 5:
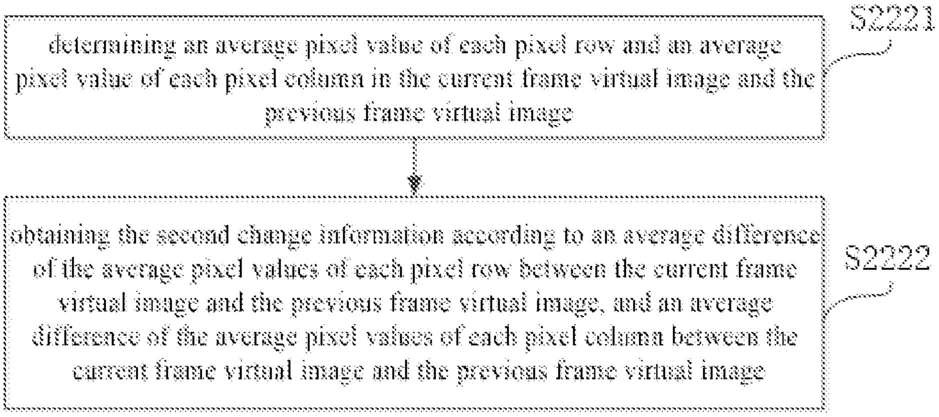
FIG. 5 is a schematic flow chart of a fourth embodiment of the frame rate changing method for an augmented reality device according to the present disclosure.

As illustrated in FIG. 5, in a fourth embodiment of the present disclosure, based on the first embodiment, obtaining the second change information between the current frame virtual image and the previous frame virtual image includes the following steps.

S2221: Determining average pixel values of each pixel row and average pixel values of each pixel column in the current frame virtual image and the previous frame virtual image.

In the embodiment, the average value of row pixels refers to an average of each row of pixels in the virtual image, and the average value of column pixels refers to an average of each column of pixels in the virtual image. Before determining the second change information, the average pixel value of each pixel row in the current frame virtual image and the average pixel value of each pixel row in the previous frame virtual image are respectively calculated based on the above row pixel average calculation formula, and then the average pixel values of each pixel column in the current frame virtual image and the average pixel values of each pixel column in the previous frame virtual image are respectively calculated based on the above column pixel average calculation formula.

S2222: Obtaining the second change information according to an average difference of the average pixel values of each pixel row between the current frame virtual image and the previous frame virtual image, and an average difference of the average pixel values of each pixel column between the current frame virtual image and the previous frame virtual image.

Specifically, the second change information is calculated using a second change information calculation formula, the second change information calculation formula is expressed as below:

$$C_2 = \frac{\sum_{p'=1}^{p'=m'} (H_1'(p') - H_2'(p')) + \sum_{q'=1}^{q'=n'} (L_1'(q') - L_2'(q'))}{m'+n'}.$$

In order to distinguish them, the average pixel value of each pixel row in the current frame virtual image is expressed as $$H_1',$$

the average pixel value of each pixel row in the previous frame virtual image is expressed as $$H_2',$$

the average pixel values of each pixel column in the current frame virtual image is expressed as $$L_1',$$

the average pixel values of each pixel column in the previous frame virtual image is expressed as $$L_2',$$

$C_2$ represents the second change information, m' represents the number of rows of pixels in the virtual image, n' represents the number of columns of pixels in the virtual image, $$H_1'(p')$$

represents the average value of row pixels of the p'-th row in the current frame virtual image, $$H_2'(p')$$

represents the average value of row pixels of the p'-th row in the previous frame virtual image, $$L_1'(q')$$

represents the average value of column pixels of the q'-th column in the current frame virtual image, $$L_2'(q')$$

represents the average value of column pixels of the q'-th column in the previous frame virtual image $$H_1'(p') - H_2'(p')$$

represents an average difference between the average value of row pixels of the p'-th row in the current frame virtual image and the average value of row pixels of the p'-th row in the previous frame virtual image, $$L_1'(q') - L_2'(q')$$

represents an average difference between the average value of column pixels of the q'-th column in the current frame virtual image and the average value of column pixels of the q'-th column in the previous frame virtual image.

According to the above technical solutions, the embodiment improves the accuracy of obtaining the second change information between the current frame virtual image and the previous frame virtual image.

Figure 6:
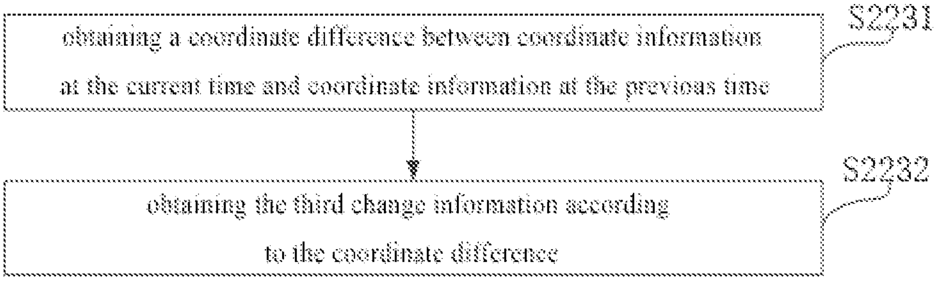
FIG. 6 is a schematic flow chart of a fifth embodiment of the frame rate changing method for an augmented reality device according to the present disclosure.

As illustrated in FIG. 6, in a fifth embodiment of the present disclosure, based on the first embodiment, the attitude parameter includes coordinate information detected by a gyroscope, obtaining the third change information between the attitude parameter at the current time and the attitude parameter at the previous time includes the following steps.

S2231: Obtaining a coordinate difference between coordinate information at the current time and coordinate information at the previous time.

S2232: Obtaining the third change information according to the coordinate difference.

In the embodiment, the attitude parameter includes coordinate information detected by a gyroscope, and the gyroscope is installed inside the AR device. The coordinate information detected by the gyroscope is the coordinate information of the AR device, and the coordinate information refers to three-dimensional space coordinates of the AR device. When the scenario information changes, three-dimensional space coordinates at the current time and three-dimensional space coordinates at the previous time are obtained and then a coordinate difference between the three-dimensional space coordinates at the current time and the three-dimensional space coordinates at the previous time is calculated, and then third change information is obtained according to the coordinate difference. In the embodiment, the coordinate difference is used as the third change information. In other embodiments, a coordinate change rate may be used as the third change information. Specifically, a coordinate difference calculation formula for the three-dimensional space coordinates at the current time and the three-dimensional space coordinates at the previous time is expressed as below:

$$C_3 = \frac{D_1(x, y, z) - D_2(x', y', z')}{S}.$$

In the above, $C_3$ represents the third change information, S represents the number of scenario information, and in the embodiment, S=3, and, $D_1(x, y, z)$ represents the three-dimensional space coordinates at the current time, $D_2(x', y', z')$ represents the three-dimensional space coordinates at the previous time.

In addition, when the scenario information changes, multiple sets of three-dimensional space coordinates can be obtained at the current time. Correspondingly, multiple sets of three-dimensional space coordinates can also be obtained at the previous time. Then, the third change information is obtained according to the above coordinate difference calculation formula, the average three-dimensional space coordinates of multiple sets of three-dimensional space coordinates at the current time and the average three-dimensional space coordinates of multiple sets of three-dimensional space coordinates at the previous time.

According to the above technical solutions, the embodiment is beneficial to improving the accuracy of the third change information.

Figure 7:
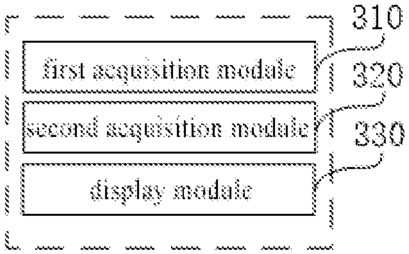
FIG. 7 is a functional module diagram of a frame rate changing system for an augmented reality device according to the present disclosure.

As illustrated in FIG. 7, the present disclosure also provides a frame rate changing system for an augmented reality devices, including: a first acquisition module 310 configured to obtain scenario information of the augmented reality device, the scenario information including at least one of an external environment image, a virtual image, and an attitude parameter of the augmented reality device; a second acquisition module 320 configured to obtain, when the scenario information changes, a target frame rate of the augmented reality device according to change information of the scenario information; and a display module 330 configured to update a frame rate of the augmented reality device according to the target frame rate, to display target content at the target frame rate.

In addition, the change information of the scenario information includes at least one of: the first change information between the current frame external environment image and the previous frame external environment image is not within a first preset range; the second change information between the current frame virtual image and the previous frame virtual image is not within a second preset range; the third change information between the attitude parameter of the augmented reality device at the current time and an attitude parameter of the augmented reality device at the previous time, is not within a third preset range.

In addition, the second acquisition module 320 includes: an information acquisition unit for obtaining the first change information between the current frame external environment image and the previous frame external environment image, the second change information between the current frame virtual image and the previous frame virtual image, the third change information between the attitude parameter at the current time and the attitude parameter at the previous time, and a preset frame rate; a frame rate calculation unit for determining the target frame rate according to the first change information, the second change information, the third change information, and the preset frame rate.

In addition, the information acquisition unit includes: a pixel calculation unit for determining average pixel values of each pixel row and average pixel values of each pixel column in the current frame external environment image and the previous frame external environment image; and a change information calculation unit for obtaining the first change information according to an average difference of the average pixel values of each pixel row between the current frame external environment image and the previous frame external environment image, and an average difference of the average pixel values of each pixel column between the current frame external environment image and the previous frame external environment image.

In addition, the pixel calculation unit is also used to determine average pixel values of each pixel row and average pixel values of each pixel column in the current frame virtual image and the previous frame virtual image.

The change information calculation unit is also used to obtain the second change information according to an average difference of the average pixel values of each pixel row between the current frame virtual image and the previous frame virtual image, and an average difference of the average pixel values of each pixel column between the current frame virtual image and the previous frame virtual image.

In addition, the attitude parameter includes coordinate information detected by a gyroscope. The pixel calculation unit is also used for obtaining a coordinate difference between coordinate information at the current time and coordinate information at the previous time.

The change information calculation unit is also used for obtaining the third change information according to the coordinate difference.

The specific implementations of the frame rate changing system of the present disclosure is substantially the same as the above embodiments of the frame rate changing method, and will not be described again here.

Those skilled in the art will understand that embodiments of the present disclosure may be provided as methods, or computer program products. Accordingly, the present disclosure may take the form of an entirely hardware embodiment, an entirely software embodiment, or an embodiment that combines software and hardware aspects. In addition, the present disclosure may take the form of a computer program product embodied on one or more computer-usable storage media (including, but not limited to, disk storage, CD-ROM, optical storage, etc.) having computer-usable program code embodied therein.

The present disclosure is described with reference to flowchart illustrations and/or block diagrams of methods, devices (systems), and computer program products according to embodiments of the disclosure. It will be understood that each process and/or block in the flowchart illustrations and/or block diagrams, and combinations of processes and/or blocks in the flowchart illustrations and/or block diagrams, can be implemented by computer program instructions. These computer program instructions may be provided to a processor of a general purpose computer, special purpose computer, embedded processor, or other programmable data processing device to produce a machine, such that instructions executed by the processor of the computer or other programmable data processing device produce a device for realizing the functions specified in one or more processes and/or blocks in the flowchart illustrations and/or block diagrams.

These computer program instructions may also be stored in a computer-readable memory that causes a computer or other programmable data processing device to operate in a particular manner, such that the instructions stored in the computer-readable memory produce an article of manufacture including a processor. Here, the processor realizes the functions specified in one or more processes and/or blocks in the flowchart illustrations and/or block diagrams.

These computer program instructions may also be loaded onto a computer or other programmable data processing device, causing a series of operating steps to be performed on the computer or other programmable device to produce computer-implemented processing, thereby providing on the instructions executed on the computer or other programmable device the steps for realizing the functions specified in one or more processes and/or blocks in the flowchart illustrations and/or block diagrams.

It should be noted that in the claims, any reference signs placed between parentheses shall not be construed as a limitation to the claims. The word "including" does not exclude the presence of elements or steps other than those listed in a claim. The word "a (an)" or "one" preceding a component does not exclude the presence of a plurality of such components. The present disclosure may be implemented by means of hardware including several different components and by means of a suitably programmed computer. In any one claim defining several components, several of these components may be embodied by the same item of hardware. The word “first”, “second”, “third”, etc. used herein do not indicate any order, and these words can be interpreted as names.

Although preferred embodiments of the present disclosure have been described, those skilled in the art will be able to make additional changes and modifications to these embodiments once the basic inventive concepts are apparent. Therefore, it is intended that the appended claims be construed to include the preferred embodiments and all changes and modifications that fall within the scope of the disclosure.

Obviously, those skilled in the art can make various changes and modifications to the present disclosure without departing from the spirit and scope of the disclosure. In this way, if these changes and modifications fall within the scope of the claims of the present disclosure and equivalent technologies, the present disclosure is also intended to include these changes and modifications.

What is claimed is:

1. A frame rate changing method for an augmented reality device, comprising:

obtaining scenario information of the augmented reality device, the scenario information comprising at least one of an external environment image, a virtual image, and an attitude parameter of the augmented reality device;

obtaining, when the scenario information changes, a target frame rate of the augmented reality device according to change information of the scenario information; and updating a frame rate of the augmented reality device according to the target frame rate, to display target content at the target frame rate, wherein determining the change information of the scenario information comprising at least one of:

a first change information between the current frame external environment image and a previous frame external environment image is not within a first preset range;

a second change information between the current frame virtual image and a previous frame virtual image is not within a second preset range; and a third change information between the attitude parameter of the augmented reality device at a current time and the attitude parameter of the augmented reality device at a previous time is not within a third preset range, wherein obtaining, when the scenario information changes, the target frame rate of the augmented reality device according to the change information of the scenario information comprises:

obtaining the first change information between the current frame external environment image and the previous frame external environment image, the second change information between the current frame virtual image and the previous frame virtual image, the third change information between the attitude parameter at the current time and the attitude parameter at the previous time, and a preset frame rate; and determining the target frame rate according to the first change information, the second change information, the third change information, and the preset frame rate.

2. The method of claim 1, wherein obtaining the first change information between the current frame external environment image and the previous frame external environment image comprises:

determining average pixel values of each pixel row and average pixel values of each pixel column in the current frame external environment image and the previous frame external environment image; and obtaining the first change information according to an average difference of the average pixel values of each pixel row between the current frame external environment image and the previous frame external environment image, and an average difference of the average pixel values of each pixel column between the current frame external environment image and the previous frame external environment image.

3. The method of claim 1, wherein obtaining the second change information between the current frame virtual image and the previous frame virtual image comprises:

determining average pixel values of each pixel row and average pixel values of each pixel column in the current frame virtual image and the previous frame virtual image; and obtaining the second change information according to an average difference of the average pixel values of each pixel row between the current frame virtual image and the previous frame virtual image, and an average difference of the average pixel values of each pixel column between the current frame virtual image and the previous frame virtual image.

4. The method of claim 1, wherein the attitude parameter comprises coordinate information detected by a gyroscope, and obtaining the third change information between the attitude parameter at the current time and the attitude parameter at the previous time comprises:

obtaining a coordinate difference between coordinate information at the current time and coordinate information at the previous time; and obtaining the third change information according to the coordinate difference.

5. The method of claim 1, wherein determining the target frame rate according to the first change information, the second change information, the third change information, and the preset frame rate comprises:

obtaining a first preset weight value corresponding to the external environment image, a second preset weight value corresponding to the virtual image, and a third preset weight value corresponding to the attitude parameter;

determining a sum of a product of the first change information and the first preset weight value, a product of the second change information and the second preset weight value, a product of the third change information and the third preset weight value; and obtaining the target frame rate according to the sum of the products, a number of scenario information, and the preset frame rate.

6. A frame rate changing system for an augmented reality device, comprising:

a first acquisition module configured to obtain scenario information of the augmented reality device, the scenario information comprising at least one of an external environment image, a virtual image, and an attitude parameter of the augmented reality device;

a second acquisition module configured to obtain, when the scenario information changes, a target frame rate of the augmented reality device according to change information of the scenario information, wherein determining the change information of the scenario information comprising at least one of: a first change information between the current frame external environment image and a previous frame external environment image is not within a first preset range; a second change information between the current frame virtual image and a previous frame virtual image is not within a second preset range; and a third change information between the attitude parameter of the augmented reality device at a current time and the attitude parameter of the augmented reality device at a previous time is not within a third preset range; and a display module configured to update a frame rate of the augmented reality device according to the target frame rate, to display target content at the target frame rate, wherein the second acquisition module comprises: an information acquisition unit for obtaining the first change information between the current frame external environment image and the previous frame external environment image, the second change information between the current frame virtual image and the previous frame virtual image, the third change information between the attitude parameter at the current time and the attitude parameter at the previous time, and a preset frame rate; and a frame rate calculation unit for determining the target frame rate according to the first change information, the second change information, the third change information, and the preset frame rate.

7. An augmented reality device, comprising: a memory, a processor, and a frame rate changing program stored on the memory and executable on the processor, wherein when the frame rate changing program is executed by the processor, steps of the frame rate changing method of claim 1 are implemented.

8. A storage medium, on which a frame rate changing program is stored, wherein when the frame rate changing program is executed by a processor, steps of the frame rate changing method of claim 1 are implemented.

* * * * *